UNITED STATES PATENT OFFICE.

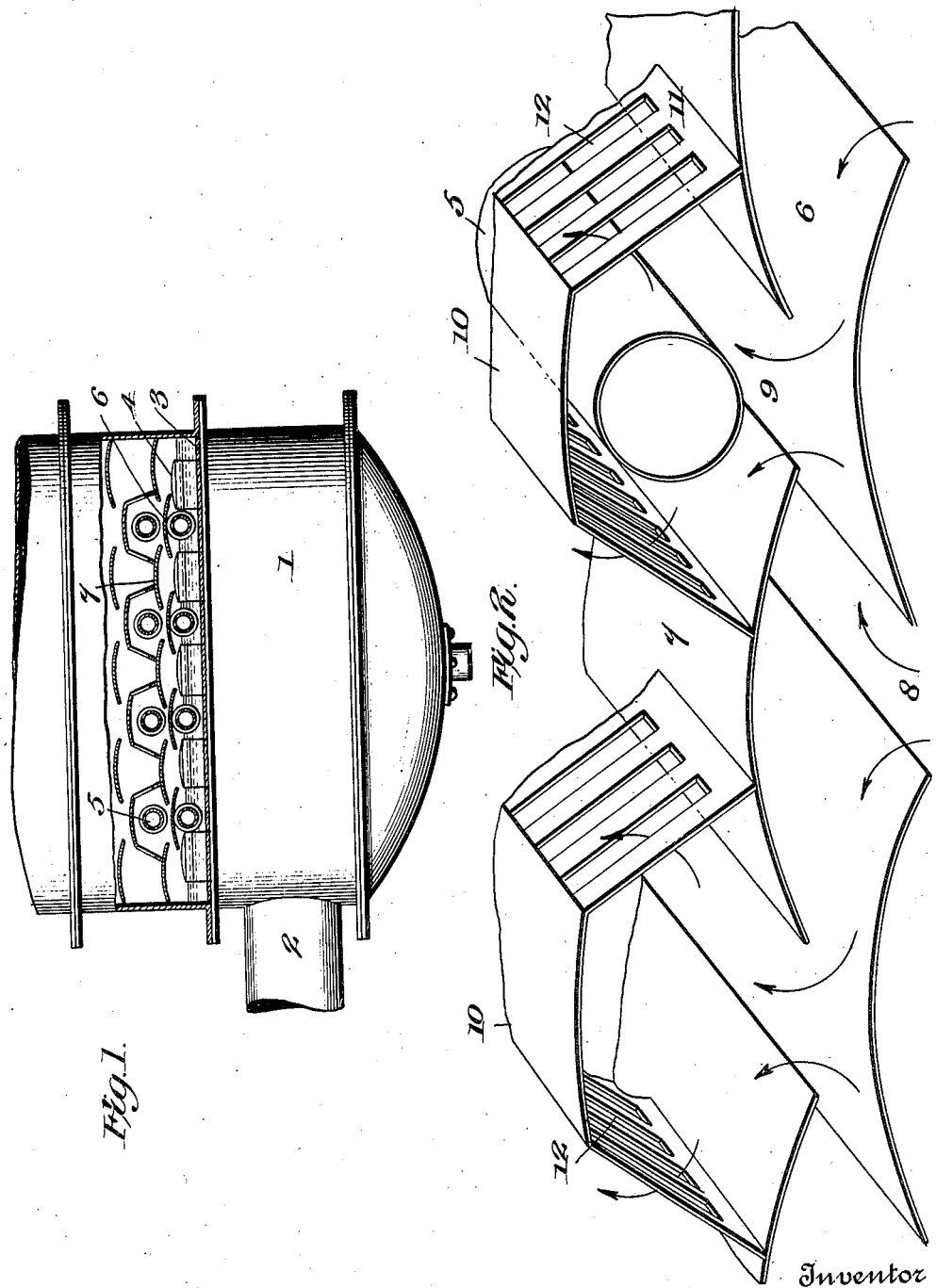

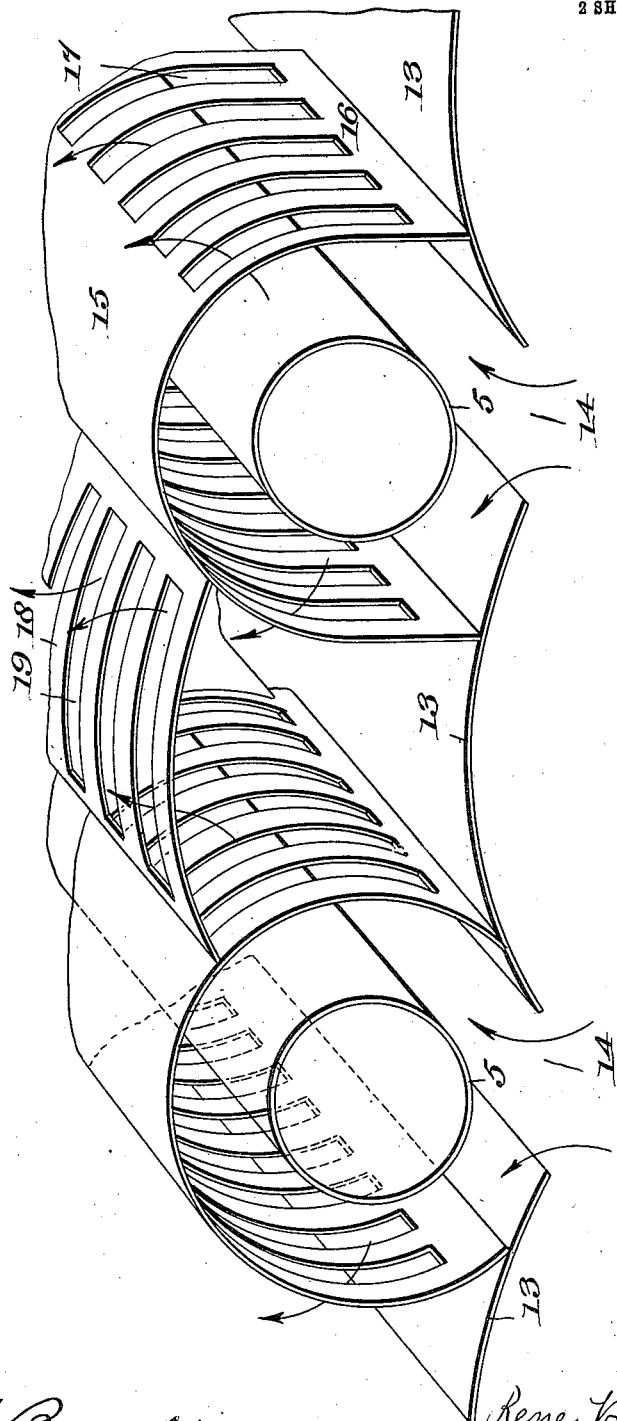

RENÉ VALLAT, OF PARIS, FRANCE.

DISTILLING OR RECTIFYING COLUMN.

No. 903,637.        Specification of Letters Patent.        Patented Nov. 10, 1908.

Application filed March 11, 1908. Serial No. 420,526.

*To all whom it may concern:*

Be it known that I, RENÉ VALLAT, a citizen of the Republic of France, residing at Paris, France, have invented certain new and useful Improvements in Distilling or Rectifying Columns; and I do hereby declare the following to be a full, clear, and exact description of the invention, such as will enable others skilled in the art to which it appertains to make and use the same.

My invention relates to distilling or rectifying columns for alcohol, petroleum, etc., and more especially to the refrigerating means used in said columns, the object being to check the rise of the vapors and to force them to travel in a tortuous course.

With this object in view, my invention consists in the construction and combinations of parts as hereinafter described and claimed.

In the accompanying drawings—Figure 1 is a perspective view, partly in section, of the lower part of a distilling or rectifying column. Fig. 2 is a perspective view, on a larger scale, of part of the refrigerating means, and Fig. 3 is a similar view of a modified refrigerating means.

1 represents the base of the column into which the vapors to be distilled or rectified are delivered through the pipe 2. This column is crossed by plates 3 having upwardly extending tubes 4, of the usual construction.

Transversely through the column pass series of pipes 5, through which air or water is passed, by any suitable means, not shown, for the purpose of refrigerating the vapors. Above the lower row of the pipes 5 are arranged a series of curved baffle plates 6, separated from each other by a space, such as 8, and above the series of baffle plates 6 is arranged another series of baffle plates 7, leaving between them a space 9, but this second series of baffle plates is arranged so as to break joints with the lower series. Above each of the spaces 9 is arranged a cooling tube 5 and above these tubes are arranged roof-like structures consisting of a top 10 and sides 11 provided with perforations 12, the effect of this structure being to cause the vapors to travel in a tortuous passage, as shown by the arrows in Fig. 2, thereby facilitating the condensation of matters carried along with the alcoholic or other vapor. The cooling tubes 5 under the roof-like structures may be omitted, as shown on the left of Fig. 2.

In Fig. 3 a modified form is shown. Between the spaces left between the pipes 5 are located baffle plates 13, leaving spaces 14 between them. Resting on two of the adjacent baffle plates 13 and encircling the tubes 5, is a roof-like structure having a curved imperforate top 15 and curved sides 16 provided with slots 17. Joining each pair of these roof-like structures is a curved plate 18 provided with slots 19, the effect of this construction being to cause the vapors to travel in a tortuous course as indicated by arrows in Fig. 3, thereby facilitating the purification of the vapors.

Having thus described my invention, I claim:—

1. In a distilling or rectifying column, the combination of a shell, plates dividing said shell into compartments, cooling tubes passing through said shell and means for causing the vapors, as they rise through said shell, to travel in a tortuous course, consisting of baffle plates arranged in proximity to said tubes, and slotted roof-like structures supported on said baffle plates, substantially as described.

2. In a distilling or rectifying column, the combination of a shell, perforated plates dividing said shell into compartments, cooling tubes passing through said shell, and means for causing the vapors, as they rise in said shell, to travel in a tortuous course, consisting of baffle plates, slotted roof-like structures supported on said baffle plates, and slotted plates supported on said roof-like structures, substantially as described.

In testimony whereof, I affix my signature, in presence of two witnesses.

RENÉ VALLAT.

Witnesses:
     DEAN B. MASON,
     JOHN BAVIER.